United States Patent [19]

Barton, IV et al.

[11] 4,332,106
[45] Jun. 1, 1982

[54] WET ROPE WEED KILLER

[76] Inventors: Joseph J. Barton, IV; Bobby G. Boyd, both of Box 341, Hale Center, Tex. 79041

[21] Appl. No.: 951,448

[22] Filed: Oct. 16, 1978

[51] Int. Cl.³ .............................................. A01N 5/00
[52] U.S. Cl. ...................................................... 47/1.5
[58] Field of Search .......................... 47/1.5, 1.43, 1.7; 56/16.8

[56] References Cited

U.S. PATENT DOCUMENTS 4,019,278  4/1977  McKirdy ............................... 47/1.5

OTHER PUBLICATIONS

The Rope Wick Applicator, Dale, Miss. Agric. & Forestry Exp. Sta., 7-5-78.

Primary Examiner—Robert E. Bagwill
Attorney, Agent, or Firm—Wendell Coffee

[57] ABSTRACT

Liquid herbicide is stored in a reservoir located above synthetic ropes. Headers and manifold tubes fluidly connect the reservoir with the ropes. As the herbicide comes down from the reservoir, it is effectively force fed into the ropes. The length of the rope stays wet due to the forced feeding. As a rope or plurality of the ropes comes into contact with a weed, a dose of herbicide is applied.

10 Claims, 4 Drawing Figures

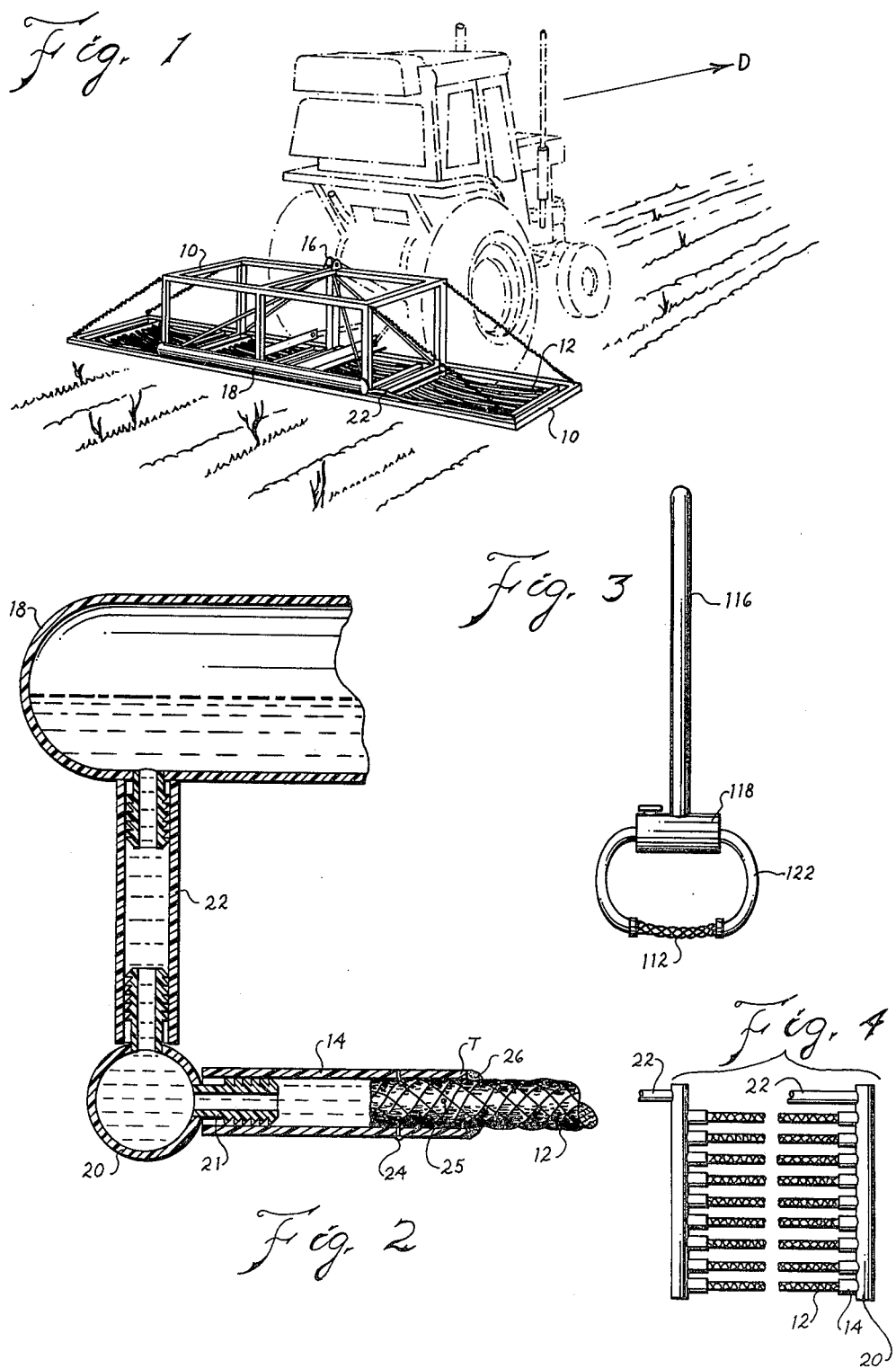

WET ROPE WEED KILLER

BACKGROUND OF THE INVENTION (1) Field of the Invention

This invention relates to agriculture, more particularly to the application of herbicides.

(2) Description of the Prior Art

The use of herbicides for control of weeds is widespread in agriculture today. Generally, pre-plant and pre-emergent herbicides may be broadcast over fields without injury to crop plants. Few herbicides, however, are specific for weeds alone and so once a crop has emerged it is necessary to treat only the weed with herbicide to avoid killing the crop plant. The problem is aggrevated in the western regions of the United States which have high temperatures, low humidity and dry winds. With the application of herbicides by a damp applicator, there is a very high evaporation rate from the applicator so that it is necessary to continually replenish the fluid supply of herbicide to the applicator.

Selective means for the dispensation of herbicides have recently come to be known. These methods of treating weeds has become increasingly important as "hoe hands", who manually kill weeds are unavailable. Also, general distribution of even pre-plant or pre-emergent herbicide stunts the growth of many crops.

Methods of selectively applying herbicides to weeds after the emergence of a crop have largely been very involved mechanically or ineffective. Heretofore, no simple method for selective application of herbicides to weeds after emergence of crops has been known in the art.

Before filing this application, applicant caused a search of the prior art to be made at the United States Patent and Trademark Office. That search revealed the following patents:

U.S. Pat. No. 1,109,060, Griffin;
U.S. Pat. No. 1,523,590, Hartshorn;
U.S. Pat. No. 1,764,952, Hay;
U.S. Pat. No. 1,818,369, Watson;
U.S. Pat. No. 2,123,988, Corley;
U.S. Pat. No. 2,935,818, Crane;
U.S. Pat. No. 3,021,642, Ewing;
U.S. Pat. No. 3,077,701, Osmun;
U.S. Pat. No. 3,320,694, Biron;
U.S. Pat. No. 4,019,278, McKirdy.

Ewing discloses a solid sheet-like wick extending from the bottom of a header with a few inches of head thereon.

Hay disclosed a boll weevil poisoner having wet strands hanging from a chamber with liquid therein.

Watson shows a series of strands hanging down vertically from an axial pipe which distributes the liquid to it.

While the other patents cited are thought by applicants to be of little interest with respect to their invention, other workers in the field are continuing to work in this area. The work done using the capillary action of woven Nylon rope is progressing at the time of this application.

SUMMARY OF THE INVENTION (1) New and Different Function

We have invented a way to selectively apply liquid herbicides to weeds in a field after the emergence of the crop. We accomplish this by pressure or force feeding liquid herbicides through loosely woven synthetic rope. The herbicide laden ropes are then brought into contact with weeds, thereby applying herbicide to the weeds. This manner of herbicide application is very selective and will not kill weeds at the expense of the growing crop. The selectivity is obtained as herbicide is only applied to plants which intersect the herbicide-laden ropes. The ropes may be adjusted such that they will apply herbicide only to weeds which they contact and not the growing crop.

There is reduced loss of herbicide due to evaporation as the herbicide is transferred from the reservoir to the ropes by a closed system of tubes. Even though there is a high evaporation rate, by pressure or force feeding the fluid herbicide into the rope, it is possible to keep the rope sufficiently damp with the herbicide to transfer an adequate amount of herbicide to any of the weeds touching the rope.

There is virtually no maintenance necessary to keep our invention working as its components, synthetic rope and PVC tubing, are very simple.

Therefore, it may be seen that great results are obtained. The results of the combination is far greater than the sum of the functions of each of the individual parts.

(2) Objects of this Invention

An object of this invention is to selectively disperse liquid herbicide.

Further objects are to achieve the above with a device that is sturdy, compact, durable, lightweight, simple, safe, efficient, versatile, ecologically compatible, energy conserving, and reliable, yet inexpensive and easy to manufacture, adjust, operate and maintain.

Other objects are to achieve the above with a method that is versatile, ecologically compatible, energy conserving, rapid, efficient, and inexpensive, and does not require skilled people to adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a perspective view of a device according to this invention attached to an agricultural tractor. The tractor is shown in phantom lines.

FIG. 2 is a sectional view showing a portion of the reservoir header and force feeding of one rope.

FIG. 3 is a schematic representation of a hand held "chemical hoe", a second embodiment.

FIG. 4 is a top plan view, foreshortened, showing the ropes between two headers of the first embodiment.

DESCRIPTION OF THE PREFERRED EMBODIMENTS

Referring to the drawings, it may be seen that frame 10 supports a collection of woven ropes 12 and manifold tubes 14. Support means 16 supports and moves frame 10 through the crop in a direction D. The frame also supports reservoir 18.

Reservoir 18 holds liquid herbicide. The herbicide exits the reservoir through fluid connections 22 from which it is fed through headers 20 into the manifold tubes 14. There are a pair of headers below the reservoir for each crop row. The manifold tubes are of 1 cm inside diameter and are located at either end of nine synthetic ropes 12, telescoped over the ends of the ropes. The other end of the tubes are telescoped over nipple 21 on the header 20. The ropes 12 are fastened within the tubes by means of at least one pin 24. A second pin 25 is inserted at right angles. The pin 24 runs from one side of manifold tube 14 diametrically through the rope 12 and out the other side of the tube. Adhesive sealer 26 is used to prevent drippage at the terminal T of the tube.

The ropes used are loosely woven Nylon. Each rope is composed of 18 strands, the strands are composed of very fine filaments. Fluids are transported along these ropes by forced feeding.

As the liquid level in reservoir 18 is at least 10 cm above the tubes, the height differential effectively force feeds or pressure feeds the herbicide into the tubes 14 and rope 22.

The frame 10 is adjusted such that the herbicide-laden ropes 22 are horizontally oriented above the crop canopy. The frame 10, ropes 22, headers 20 and manifold tubes 14 are then drawn through the field as by a tractor. The ropes 22 encounter weeds which are above the crop height, thereby accomplishing the selective contacting of the herbicide with the weed and not the crop plant.

The embodiment of FIG. 3 shows a pair of spaced apart tubes 122 fluidly connecting the reservoir 118 to synthetic woven rope 112. The rope 112 is inserted into the end of the tubes 122. While this configuration does not make use of a header and manifold tubes, there remains a head or height differential between the herbicide in the reservoir and the insertion point of the ropes. The same force feeding properties are obtained.

As an aid to correlating the terms of the claims to the exemplary drawing, the following catalog of elements is provided:

10: frame
12: ropes
14: manifold tubes
16: support means
18: reservoir
20: header
21: nipple
22: fluid connections
24: pin
26: adhesive sealer.

The embodiments shown and described are only exemplary. We do not claim to have invented all the parts, elements or steps described. Various modifications can be made in the construction, material, arrangement, and operation, and still be within the scope of the invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a wet rope applicator for applying herbicides to weeds comprising in combination:
    a. a reservoir of liquid herbicide,
    b. a pair of spaced apart tubes below the reservoir fluidly connected to the reservoir,
    c. support means for supporting the reservoir,
    d. a loose woven synthetic rope having two ends with one end in one tube and the other end in the other tube,
    e. so that liquid herbicide is pressure fed into each end of the rope.

2. The invention as defined in claim 1 further comprising:
    f. adhesive seal around the rope at the terminal of each tube.

3. The invention as defined in claim 1 further comprising:
    f. at least one pin extending diametrically through each of the tubes and the rope to secure the rope in the tube.

4. The invention as defined in claim 3 further comprising:
    g. adhesive seal around the rope at the terminal of each tube.

5. In a wet rope application for applying herbicides to weeds above a row crop canopy having
    a. a frame supporting
    b. a horizontal array of loose woven synthetic ropes,
    c. support means on the frame for supporting and moving the frame through crop; the improved structure for supplying liquid herbicide to the rope comprising:
    d. a reservoir of liquid herbicide,
    e. a pair of headers below the resrvoir for each crop row,
    f. fluid connections for the reservoir to each header,
    g. a manifold of tubes extending from each header,
    h. an end of a rope in each of the tubes in the pair of headers,
    j. so that liquid herbicide is pressure fed into each end of each rope.

6. The invention as defined in claim 5 wherein
    k. there are about nine tubes in each header,
    m. each tube being about 1 cm inside diameter,
    n. each tube telescoped over a nipple in the header, and
    o. the headers are about 10 cm below the reservoir.

7. The invention as defined in claim 5 further comprising:
    k. an adhesive seal around the rope at the terminal of each tube.

8. The invention as defined in claim 5 further comprising:
    k. at least one pin extending diametrically through each of the tubes and ropes to secure the rope in the tube.

9. The invention as defined in claim 8 further comprising:
    m. an adhesive seal around the rope at the terminal of each tube.

10. The invention as defined in claim 9 wherein
    n. there are about nine tubes in each header,
    o. each tube being about 1 cm inside diameter,
    p. each tube telescoped over a nipple in the header, and
    q. the headers are about 10 cm below the reservoir.

* * * * *